No. 861,300. PATENTED JULY 30, 1907.
W. H. MACK.
HOSE COUPLING.
APPLICATION FILED OCT. 8, 1906.
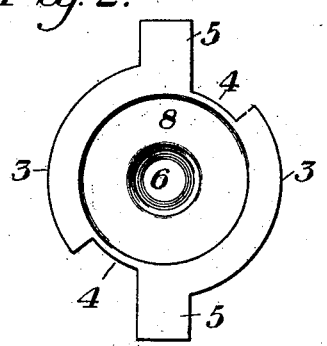
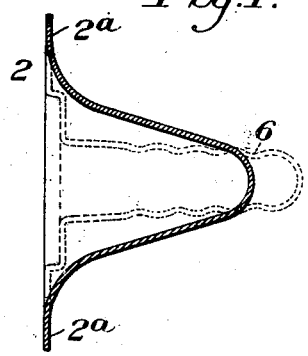
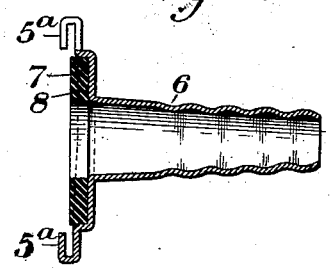
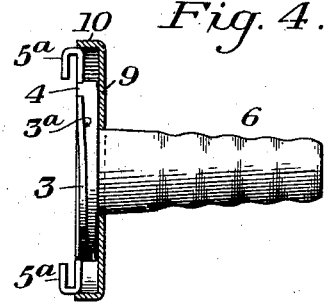
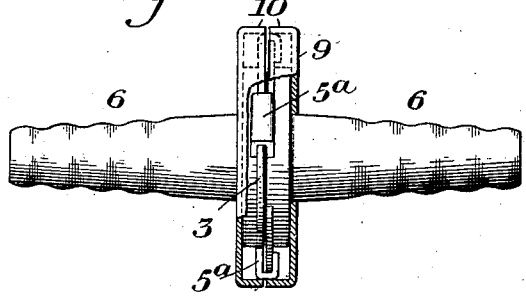
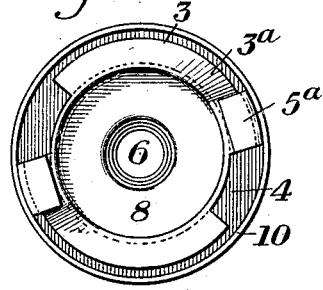
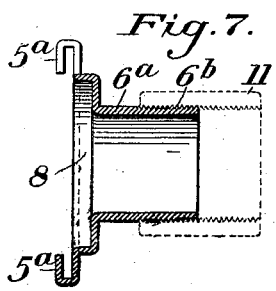
WITNESSES
R A Balderson
W W Swartz
INVENTOR
Wm H. Mack,
by Bakewell & Byrne,
his attys

UNITED STATES PATENT OFFICE.

WILLIAM H. MACK, OF WILKINSBURG, PENNSYLVANIA.

HOSE-COUPLING.

No. 861,300.  Specification of Letters Patent.  Patented July 30, 1907.

Application filed October 8, 1906. Serial No. 337,879.

*To all whom it may concern:*

Be it known that I, WILLIAM H. MACK, of Wilkinsburg, Allegheny county, Pennsylvania, have invented a new and useful Hose-Coupling, of which the following is a full, clear, and exact description, reference being had to the accompanying drawings, forming part of this specification, in which—

Figures 1 and 2 are views illustrating different steps in the manufacture of my hose coupling; Fig. 3 is a central longitudinal section of the completed coupling member without the casing; Fig. 4 is a side view of the same with the casing in section; Fig. 5 is a side view of a complete coupling partly broken away; Fig. 6 is an end view of one of the coupling members; and Fig. 7 is a sectional view showing a modification.

My invention has relation to the class of hose couplings, and is designed to provide a simple and efficient coupling which can be manufactured at a low cost from sheet metal.

With this object in view my invention consists in the novel construction, arrangement and combination of parts, all substantially as hereinafter described and pointed out in the appended claims.

In the manufacture of hose couplings in accordance with my invention, I take a circular blank 2 of sheet metal, preferably sheet steel, and by means of suitable dies press it into the shape shown in full lines in Fig. 1, this shape being further pressed by means of dies into the shape shown in dotted lines in said figure. The flange portion 2ª of the blank thus formed is then cut or trimmed into the shape shown in Fig. 2 to form the two flanges 3 separated from each other by the recesses 4 and having the diametrically opposite tongues 5. The closed end of the tube or shank portion 6 is then cut off as shown in Fig. 3, and the tongues 5 are bent to form the inwardly-opening hooks 5ª. The gasket 7 is seated in the annular depression 8 provided therefor. In order to protect the hooks 5ª from becoming bent or injured, which might very easily otherwise occur owing to the manner in which the couplings are frequently dragged over the floor or ground, I preferably provide the separate casing 9 which is fitted over the base of the tubular shank 6 and which is provided with the circumferential flange 10.

In assembling the coupling, the two coupling sections are opposed to each other and the hooks 5ª of each section are engaged with the recesses 4 of the other section. The two sections are given a partial turn relatively to each other causing the hooks to ride underneath the flanges 3. The latter are shaped in their formation to give the inclined or cam surfaces 3ª, whereby as the sections are rotated the gaskets 7 of the two sections are drawn tightly together to form a closed joint. The two casing portions 9 come approximately together as shown in Fig. 5 and form an efficient protection for the hooks.

The form of coupling shown in Figs. 1 to 6 inclusive is especially designed for use with hose of comparatively small diameter. For a larger hose the construction shown in Fig. 7 is used in which the shank or stem portion 6ª is made of larger diameter and shorter, threads 6ᵇ being pressed or cut in its outer surface to receive the usual coupling nipple, as shown in dotted lines in said figure. The construction is otherwise the same as that shown in the other figures.

The advantages of my invention consist in the provision of a coupling by means of which a tight joint can be readily and quickly made, and which can be constructed entirely from sheet metal, thereby greatly reducing its cost.

Various changes may be made in the details of construction and arrangement without departing from the spirit and scope of my invention, since

What I claim is:—

1. A hose coupling member having a tubular stem or shank, and a coupler head formed with coupler hooks and coupler engaging portions, said parts being formed of an integral piece of sheet metal; substantially as described.

2. As a new article of manufacture, a sheet metal hose coupling member having a tubular stem or shank, and a coupler head formed with coupler hooks and hook-engaging flanges, said parts being formed in an integral piece; substantially as described.

3. A hose coupling member consisting of a tubular shank, a head portion formed with flanges separated from each other by recesses, and a coupler hook at one end of each flange, said flanges also inclosing a gasket seat, the whole being formed of an integral piece of sheet metal; substantially as described.

4. A hose coupling member having a tubular shank or stem, a head portion formed with diametrically opposite hooks and with hook-engaging flanges, and a casing secured thereto and arranged to inclose and protect the hooks and flanges said casing consisting of a disk-like member seated on the tubular shank or stem and having its edge portion flanged inwardly to substantially meet the corresponding flange of a similar casing on an opposing coupling section; substantially as described.

5. A hose coupling member having a tubular stem or shank, a head formed with oppositely-arranged coupler hooks and with cam flanges for the engagement of the hooks of an opposing section, and a casing surrounding and protecting said hooks and flanges said casing consisting of a disk-like member seated on the tubular shank or stem and having its edge portion flanged inwardly to substantially meet the corresponding flange of a similar casing on an opposing coupling section; substantially as described.

6. As a new article of manufacture, a hose coupling member having a tubular shank or stem formed from the central portion of a sheet metal disk or blank, and a head portion formed from the marginal portions of the same sheet or blank, said head having integral coupling means; substantially as described.

In testimony whereof, I have hereunto set my hand.

WILLIAM H. MACK.

Witnesses:
H. M. CORWIN,
GEO H. PARMELEE.